United States Patent Office 3,168,900
Patented Feb. 9, 1965

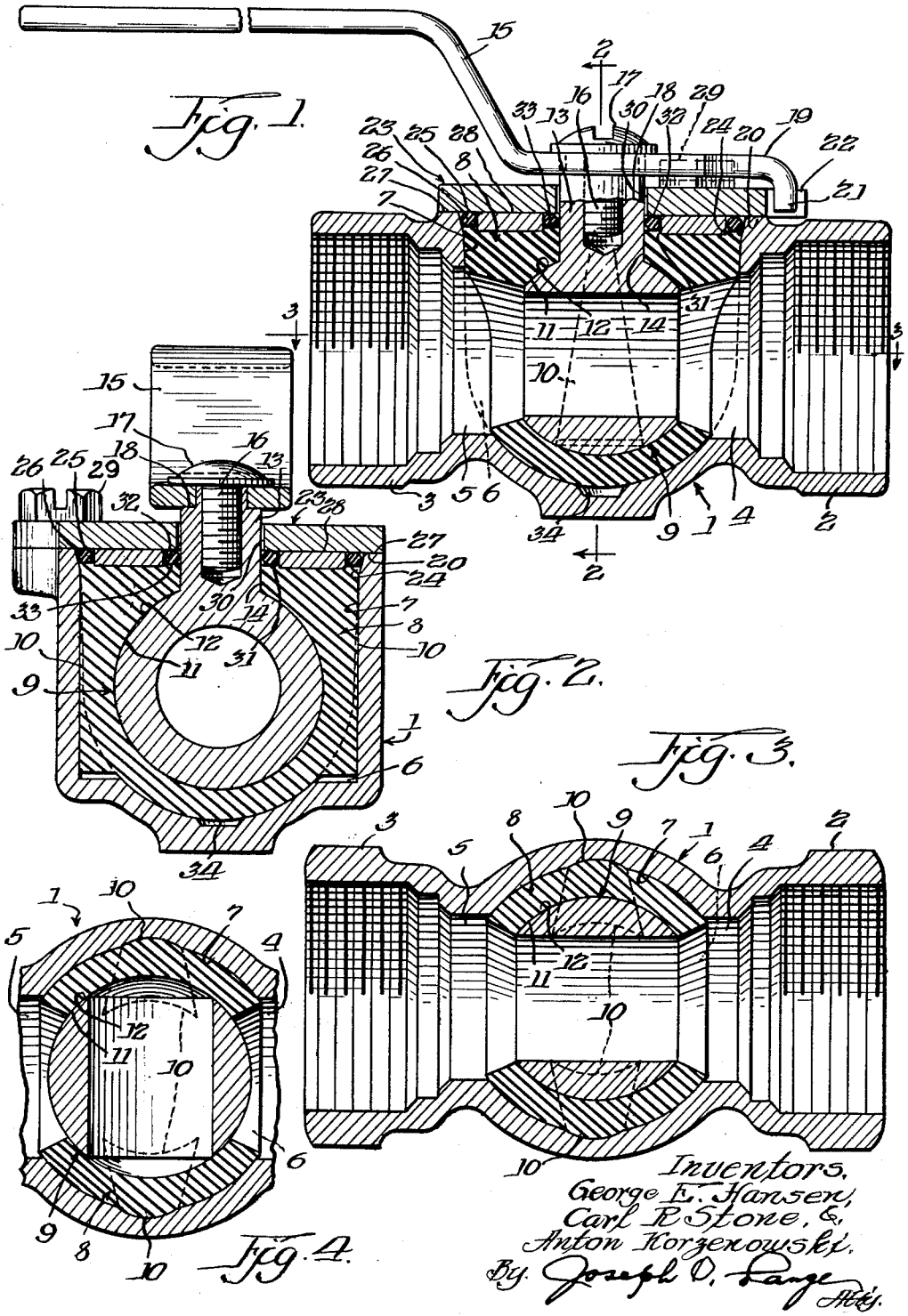

3,168,900
BALL VALVE WITH FLEXIBLE BONNET
George E. Hansen, Elmwood Park, Carl R. Stone, Lombard, and Anton Korzenowski, Brookfield, Ill., assignors to Crane Co., Chicago, Ill., a corporation of Illinois
Filed Mar. 23, 1962, Ser. No. 181,928
6 Claims. (Cl. 137—454.6)

This invention relates generally to valves, and, more particularly, to ball valves of the general character covered in the ball valve patent application identified as Serial No. 77,901, filed December 23, 1960, now United States Patent No. 3,100,501, issued August 13, 1963, of which this instant invention is an improvement thereover.

At the outset, in order to acquire a better appreciation of the benefits of this invention, it should be understood that it has long been realized that a ball valve was desirable having a single important objective; to wit: a universal valve for general use, relating relatively low cost to such attributes as quality, utility, performance, serviceability, and appearance.

Therefore, it is one of the more important objects of this invention to embody in a relatively simple design a construction having the above mentioned benefits.

It is one of the more important objects of this invention to provide a ball valve in which the spheroidal ported closure member and the actuating means therefor, such as the stem, are of a unitary construction and are molded in rubber, composition, or similar materials, preferably having a hardness not deformable or otherwise objectionably affected in the normal course of service involving external or internal line fluid pressures.

It is therefore another important object of this invention to provide for a construction in which the internal surfaces of the molded rubber seat are molded to conform to the shape of the encapsulated spheroidal closure member and stem.

Another important object is to provide for a ball valve construction of the character hereinafter described in which the outer contour of the rubber or like seat is molded with a preferably tapered contour, the outer portion of which is provided with protruding lugs or recesses to contact identical engaging means in the valve body to positively prevent rotation of the complete unit when inserted in an identical body contour formed to match the outer shape of the molded rubber seat.

A further important object is to provide for a ball valve construction in which such rotation-preventing lugs as above referred to also serve as a reinforcement when the valve is in the closed position whereby to prevent or minimize extrusion of the valve seat and preventing portions of the latter from entering the valve port.

In connection with a further object, it should be appreciated that the rubber compounds for valve seats and the like are practically incompressible and therefore the volume of such seat remains constant regardless of the distortion occurring during the course of assembly or in service. Therefore, a further object here is to provide for a valve seat in which the contour of the outer rubber seat and the shape of the body receiving said seat must be made to substantially the same configuration in order to provide for a completely supported unit. In this connection, it will further be appreciated that as the compression load placed upon the rubber seat to match the contour of the receiving body increases the operating torque required to turn the closure member and the stem in the encapsulated rubber seat is likewise increased.

It is therefore a further object in obtaining a proper or satisfactory operating mechanism with reference to the tapered angle in the valve body for proper compression to provide for such angle as hereinafter described, defining the outer conical shape of the rubber seat to be made within angles say from 1° to 10° from the valve vertical axis.

It is a further important provision to provide for a construction that such rubber seat or liner as referred to may be provided with opportunity for a controlled expansion thereof. Specifically, it is a further object here to provide a ball valve with a bonnet plate construction capable of receiving the total force exerted by line fluid pressure acting upon the exposed area of the bonnet closure when assembled with the valve.

Another object is to provide for a valve construction in which provision is made within the casing to receive such distorted portions of the seat or liner without adversely affecting or closing in on ported portions of said seat or liner.

A still further important object is to provide for a bonnet or plate cover of a relatively thin gauge sheet material, which when assembled on the body preferably provides a metal-to-metal contact therebetween and to provide in such bonnet or plate construction what may be termed a cantilever arrangement when to bend or flex suitably when and if the volume of the rubber seat or liner exceeds the volume of the valve body chamber.

Other objects and advantages will become more readily apparent upon proceeding with the following description read in light of the accompanying drawings, in which:

FIG. 1 is a sectional assembly view of a ball valve embodying our invention;

FIG. 2 is a transverse sectional view taken on the line 2—2 of FIG. 1;

FIG. 3 is a transverse sectional view taken on the line 3—3 of FIG. 1 with the valve in the open position; and FIG. 4 is a fragmentary sectional view of the construction referred to in FIG. 3, but with the valve in the closed position.

Similar reference numerals refer to similar parts throughout the several views.

Referring now to the drawings, and particularly to FIG. 1, the valve casing or body generally designated 1 is provided with the usual oppositely disposed end connecting portions 2 and 3 respectively for attachment to a pipe line (not shown). While ordinary threaded pipe connections have been illustrated, it will of course be understood that other suitable modes of attachment to pipe or tubing may be employed, depending upon the nature of the service without departing from the scope of the invention. The valve body 1 has connecting ports 4 and 5 leading to a valve chamber or cavity 6, preferably of frusto-conical ported configuration, as prescribed by the annular tapered surface 7.

Snugly fitted within the valve chamber 6, a frusto-conical seat or liner generally designated 8 preferably of rubber or other suitable composition is mounted and in an encapsulating manner revolubly receives the spheroidal ported closure member 9. The said seat 8 is preferably molded around the closure member 9 in the original step of the seat manufacture and assembly, thereby accounting for a close clearance or bearing being provided between the respective surfaces 11 of the liner and 12 of the closure member as indicated.

Preferably integrally therewith, an actuating stem portion 13 for rotating said closure member is provided, projecting through a transverse opening 14 in the seat liner 8 as shown. At its upper limit, the stem portion is provided with the usual operating lever 15 attached as at 16 by means of a cap screw 17 to the stem surface or shoulder 18. The said arrangement provides in cooperation with the head of the cap screw for the mounting of a combined stop and indicating portion receiving the lever portion 19 with the downward depending end limit 21 movable in the relieved portion 22 of the bonnet plate or cover generally designated 23. This structural arrangement provides for the desired 90° of rotation in closing or opening the valve.

An important phase of the invention lies in the bonnet structure employed as well as in the sealing means cooperating therewith. Provision is thus made for liner or seat expansion as hereinafter described. It will be noted that in the upper limits of the valve chamber 6 as defined by the annular taper surface 7 an outwardly chamfered portion designated by the surface 24 is provided. The purpose of the said chamfered portion is to provide for convenient and easier assembling of the O-ring 25 and it also allows for additional relief for the expansion of the upper end portion of the rubber comprising the upper peripheral portion 26 on the seat member 8. It will also be noted that the seat member when inserted in the body is in a substantially lower plane than the top surface as indicated at 27. Further, the washer 28 is mounted on top of the rubber seat which before assembly of the bonnet 23 to the body allows for the said washer to project slightly above the top of the body surface 27 by a matter of a few hundredths of an inch. It has been found that this provision insures generally of the desired amount of compression being applied to the washer 28 when the bonnet cover 23 is finally assembled on the valve body by means of the bonnet screws, only one of which is shown as at 29. It may be mentioned herein reference to actual tests that tight valves insofar as the fluid sealing connection between the body and bonnet is concerned can be made with a compression from .020" to .070". Of course, as previously stated, it should be realized that the relationship of such compression to the operating torque causes a compression increase to correspondingly increase of the operating torque of the valve.

For fluid sealing purposes between the stem 13, the bonnet aperture 30 and the aperture 31 of the bonnet washer 28, an inner end smaller O-ring 32 is mounted, being received on the inner annular shouldered portion 33 of the seat 8. It will be appreciated that through the attachment of the bonnet, the compression load is applied to the O-ring and also to the washer 28, causing the protrusion of the annular surfaces at 33 and 26 to be moved into the respective O-ring chambers. It will be understood as previously referred to that by reason of the chamfered surface 24, provision is thus made for easier assembly of the O-ring 25 and the arrangement also allows for additional relief of the rubber at the outer periphery of the frusto-conical seat as represented by the upper annular surface 26.

It will further be understood from the construction just described that a novel sealing means of the bonnet plate 23 has ben effected between the inner and outer seals 32 and 25 of the stem portion 13 and the body chamfer 24. The floating O-ring spacer or retaining washer 28 is preferably made with a predetermined aperture as at 31 and thus provides the required compression of the O-ring 32 relative to the stem portion 13 to eliminate fluid leakage therepast.

With reference to the outer O-ring 25, the outer seal thus provided functions as an additional safeguard in eliminating bonnet fluid leakage between the surface 27 of the body and the undersurface 20 of the bonnet. Due to the shape of the construction just described, including the sealing O-rings, objectionable leakage is thus prevented. Since the O-ring 25 is preferably of a larger diameter than the top of the seat 8, provision is made for the tapered surface at 24 to receive the O-ring 25. It will be appreciated that the outside diameter of the spacer washer member 28 is made to such proportions as to allow for the desired compression to be effected on the outer periphery of such washer with the O-ring 25. The bonnet plate 23 as hereinabove referred to possesses the advantage that not only does it serve as the cover for the valve chamber 6, but it also provides for the stop in controlling the open and closed positions of the valve. It also serves by reason of the aperture at 30 for providing a trunnion serving as a guide for the stem 13 during the operation of the valve as well as preventing misalignment of the closure member in assembly with the body.

In consideration of the manifold functions of the said bonnet plate 23 as hereinafter mentioned, it should be understood that it preferably be made of a relatively thin gauge sheet material which when assembled on the valve body preferably makes a metal-to-metal contact with the surface 27 of said body as shown. Thus, it will be appreciated that since rubber or other suitable compositions are considered incompressible and during normal manufacture are subject to variations in heights vary the planes of the surfaces 33 and 26 the volume in the body is correspondingly affected. In the instant invention, the bonnet cap 23 functions as a cantilever to bend or flex if the volume of the rubber of the seat member 8 exceeds the volume of the body cavity 6. In this connection, mention is made that in some instances as much as .04" variation in height have still provided tight valves with moderate operating torques. It will further be understood that by virtue of the deflection of the bonnet member 23 due to the increase in volume of the rubber as may normally take place in assembling the valve, an otherwise difficult assembling problem is eliminated. Thus, in effect, the bonnet cover 23 functions as a flexible relief means, permitting variations in the volume of the member 8, together with its sealing and compression assembly as constituted by the spacer washer member 28 and the sealing rings 25 and 32.

The protruding lugs 10 preferably extend for substantially the full height of the seat member 8 and as indicated in FIG. 2 serve as a means for reinforcing the seat 8 as well as preventing rotation thereof as shown more clearly in FIGS. 3 and 4.

In connection with allowing for reinforcement as well as for escape of surplus seating material and preventing the entry of the material constituting the seat or liner 8 under certain circumstances past body ports 4 and 5, the body 1 may be supplied under some conditions with a relieved portion or recess 34. The latter recess will receive the surplus material of said liner.

In summary, it will be understood that a compact, easily operated, readily adjustable valve has been provided, in which ease of assembly as well as disassembly can be conveniently made without the necessity for removing the valve body or casing from the pipe line.

It will also be appreciated that by merely loosening the cap screws 29 and employing the lever 15 by a cantilever action the entire assembly of the closure member, seat washers and bonnet can be removed as a unit from the body for inspection, replacement, or repair.

While only a single embodiment has been disclosed and described herein, it should be apparent that the manner of exemplifying our invention is capable of being set forth in many other modifications falling within the spirit of our invention. We desire, therefore, to be limited only to the extent of the claims appended hereto interpreted in light of such limitations as may be imposed by the state of the art.

We claim:
1. A ball valve comprising a casing with inlet and outlet ports and a substantially frusto-conical valve chamber therebetween;
    a hollow flexible ported frusto-conical seat member with a spheroidal chamber and with an inner substantially rounded end wall non-rotatably mounted in said casing to cover a wall surface in a plurality of planes defining said valve chamber except for that ported portion thereof communicating with said ports constituting the inlet and outlet;
    a spheroidal ported closure member rotatably slidable in fluid sealing relation within the spheroidal chamber of said seat member;
    bonnet means cooperating with an upper open portion of the valve chamber of the casing to bear abuttingly against an upper outer transverse surface portion of said flexible seat member to effect a compression load against said seat member around said closure member;

and plurality of sealing means between said bonnet means and said outer transverse surface of said seat member comprising a washer-like plate and a plurality of O-rings extending respectively in identical planes around inner and outer peripheral portions of said washer-like plate;

the said bonnet means bearing against said washer-like plate and O-rings and being flexible and resilient to a predetermined degree whereby to permit slight expansion of said seat member axially outward upon attachment and flexing of said bonnet means relative to said casing at annular portions thereof in inner and outer perimetral relation to said bonnet means, the said bonnet means deflecting within its elastic limit an amount sufficient to accommodate the volume of the said washer-like plate and seat member projecting beyond the surface defining the outer limits of said casing valve chamber.

2. A ball valve with flexible seating means of a sleeve-like configuration comprising a casing with inlet and outlet ports and a substantially frusto-conical valve chamber therebetween with its inner end limit defined by a rounded end portion for receiving said seating means;

said flexible seating means consisting of a one-piece hollow flexible transversely ported frusto-conical seat member with an inner rounded end wall, the outer surface thereof substantially coinciding with said rounded end portion of the valve chamber;

said seat member having parallel side disposed projecting reinforcing lugs of tapered configuration when viewed in end elevation for centering said seat member in said casing valve chamber with relation to said casing inlet and outlet ports and being non-rotatably mounted in said casing to overlie the wall surface defining said valve chamber except for that transversely ported portion thereof communicating with said casing ports constituting the inlet and outlet;

a spheroidal ported closure member fitted in fluid sealing rotatable relation within said seat member;

stem actuating means therefor;

bonnet means apertured to fit over said stem actuating means and cooperating with an upper annular portion of the casing to bear abuttingly against an upper outer surface portion of said flexible seat member to effect a compression load against said seat member;

and sealing means cooperating with an inner peripheral limit of said bonnet means to bear against a peripheral portion of said stem actuating means projecting through said bonnet means;

the said bonnet means being resiliently flexible and cooperating with said casing and sealing means to permit slight flexing and dishing of said bonnet means and deflection outwardly of said casing to accommodate expansion of said seat member through an opening in the valve chamber normally covered by said bonnet means upon predetermined attachment of the bonnet means to said casing to effect said deflection.

3. A ball valve comprising a casing with inlet and outlet ports and a substantially frusto-conical valve chamber therebetween with its inner end limit defined by a rounded end portion;

a hollow flexible ported frusto-conical one-piece seat member with an inner substantially rounded end wall supported within said rounded end portion of the valve chamber;

said seat member being non-rotatably mounted in said chamber to substantially line said valve chamber except for that ported portion thereof communicating with said casing ports constituting the inlet and outlet;

the said seat member and casing having parallel lugs therebetween defined by oppositely disposed converging tapered surfaces when viewed in end elevation for effecting said non-rotatability and centering of said seat member in relation to said casing ports;

a rotatable spheroidal ported closure member snugly fitted in fluid sealing relation within a spheroidal chamber of said seat member;

stem actuating means for said closure member;

bonnet means apertured to receive said stem actuating means and cooperating with an upper surface portion of said casing to bear against an upper outer surface portion of said flexible seat member whereby to effect a compression load against said seat member around said closure member upon predetermined assembly of the said bonnet means over the larger end of said frusto-conical chamber defined by an opening between said bonnet means and said casing;

a plurality of sealing means for said stem actuating means and seat member disposed on said seat member in the valve chamber opening between said seat member and bonnet means;

said bonnet means being of elastic thin plate configuration and flexible to a predetermined extent to permit limited movement of said sealing means and expansion of an annular upper portion of said seat member outwardly through said valve chamber opening upon predetermined attachment of said bonnet means at annular portions thereof to an outer transverse surface on said casing whereby to permit transverse deflection of said bonnet means outwardly within its elastic limit sufficient to receive at least a portion of said sealing means and said seat member projecting beyond said valve chamber opening.

4. A ball valve comprising a casing with inlet and outlet ports and a substantially frusto-conical valve chamber therebetween having an inner end limit defined by a rounded end portion;

said valve chamber at an outer end shallow portion thereof being defined by an outwardly tapered annular surface;

a hollow flexible ported frusto-conical one-piece seat member with an inner substantially rounded end wall supported on said similarly rounded end portion in said casing valve chamber;

said seat member being non-rotatably mounted in said chamber to line the wall surface defining said valve chamber except for that ported portion thereof communicating with said casing ports constituting the inlet and outlet;

a spheroidal ported closure member rotatably mounted in fluid sealing relation within a spheroidal ported chamber of said seat member;

stem actuating means for rotating said closure member;

sealing means on said seat member positioned in the valve chamber shallow portion defined by said outwardly tapered annular surface of the valve chamber;

the said stem actuating means defining the inner peripheral limits of said sealing means;

a plate-like bonnet cover attached on an upper portion of said casing to bear against said sealing means on the upper outer surface portion of said flexible seat member and on inner and outer peripheral limits of said sealing means in a plane below said bonnet cover means of attachment but within said shallow portion of the valve chamber to effect a fluid seal with said seat member at the said valve chamber defined by said outwardly tapered annular surface and the inner limits defined by said actuating means;

the said bonnet cover being resiliently flexible to permit slight deflection of said bonnet cover within its elastic limit and slight expansion of said seat member and said sealing means outwardly of said valve chamber upon predetermined attachment of said bonnet cover to overlie a perimetral surface portion of said casing in a plane above said sealing means and said shallow portion of the valve chamber defined respectively by said outwardly tapered annular surface of said valve chamber and said stem actuating means.

5. A ball valve comprising a casing with inlet and outlet ports and a substantially frusto-conical valve chamber therebetween defined at an inner end limit thereof by a substantially spheroidal surface;

a hollow flexible ported frusto-conical one-piece seat member with an inner rounded end wall normally bearing against said spheroidal surface of said valve chamber;

said seat member being non-rotatably held in said casing to substantially line the casing wall surface defining said valve chamber except for the ported portions thereof communicating with said casing ports constituting said inlet and outlet;

the means for inhibiting rotation of said seat member comprising a relieved portion between said seat member and casing having stops thereon cooperating with the casing to limit the axial movement of the said seat member inwardly relative to said casing;

a spheroidal ported closure member rotatably movable in fluid sealing relation within said seat member;

an actuating stem for said closure member mounted within the inner periphery of one of the said ported portions of said seat member, the latter portion being in a plane transverse to the other ported portions;

sealing means for said seat member and said actuating stem mounted on said seat member;

plate-like bonnet means attached to upper surface portion of said casing to bear against said sealing means on said flexible seat member to effect compression loads against said seat member and said sealing means;

said sealing means including a flat ring to maintain a portion of said sealing means in the same plane in spaced apart relation;

said bonnet means being flexible and resilient to a limited extent not to exceed its elastic limit whereby to permit slight expansion of said seat member and sealing means outwardly upon predetermined attachment of the bonnet means to the said casing.

6. The subject matter of claim 5, the said casing valve chamber having a relieved portion of said rounded inner end wall to predeterminately receive a portion of said flexible seat member upon deformation of said seat member.

References Cited in the file of this patent

UNITED STATES PATENTS

| | | |
|---|---|---|
| 939,927 | Smith | Nov. 9, 1909 |
| 2,117,456 | Schellin | May 17, 1938 |
| 2,387,013 | Fuller | Oct. 16, 1945 |
| 2,766,961 | Meusy | Oct. 16, 1956 |
| 2,913,219 | Freed | Nov. 17, 1959 |
| 2,920,650 | Moog | Jan. 12, 1960 |
| 3,041,036 | McFarland | June 26, 1962 |

FOREIGN PATENTS

| | | |
|---|---|---|
| 690,367 | Great Britain | Apr. 15, 1953 |
| 116,535 | Sweden | June 4, 1946 |